(12) United States Patent
Kurdi

(10) Patent No.: US 8,296,765 B2
(45) Date of Patent: Oct. 23, 2012

(54) METHOD OF FORMING A PERSONAL MOBILE GRID SYSTEM AND RESOURCE SCHEDULING THEREON

(76) Inventor: Heba A. Kurdi, Riyadh (SA)

( * ) Notice: Subject to any disclaimer, the term of this patent is extended or adjusted under 35 U.S.C. 154(b) by 325 days.

(21) Appl. No.: 12/805,363

(22) Filed: Jul. 27, 2010

(65) Prior Publication Data

US 2012/0030683 A1 Feb. 2, 2012

(51) Int. Cl.
*G06F 9/46* (2006.01)
*G06F 15/16* (2006.01)
*G06F 15/173* (2006.01)

(52) U.S. Cl. ........ 718/101; 718/102; 718/104; 718/105; 718/106; 709/201; 709/223; 709/224; 709/225; 709/226

(58) Field of Classification Search ................ None
See application file for complete search history.

(56) References Cited

U.S. PATENT DOCUMENTS

| | | | |
|---|---|---|---|
| 7,406,689 B2 * | 7/2008 | Berstis et al. ................ | 718/102 |
| 7,441,241 B2 * | 10/2008 | Dawson et al. ............... | 718/102 |
| 7,515,899 B1 | 4/2009 | Carr et al. | |
| 2006/0031509 A1 | 2/2006 | Ballette et al. | |
| 2006/0059492 A1 * | 3/2006 | Fellenstein et al. ........... | 718/104 |
| 2006/0064698 A1 | 3/2006 | Miller et al. | |
| 2006/0070067 A1 | 3/2006 | Lowery | |
| 2006/0198294 A1 | 9/2006 | Gerlach | |
| 2006/0294238 A1 | 12/2006 | Naik et al. | |
| 2007/0112574 A1 | 5/2007 | Greene | |
| 2007/0233827 A1 | 10/2007 | McKnight | |
| 2007/0240161 A1 * | 10/2007 | Prabhakar et al. ........... | 718/104 |
| 2007/0255833 A1 | 11/2007 | Sharma et al. | |
| 2008/0028405 A1 * | 1/2008 | Martin et al. ................. | 718/102 |
| 2008/0250408 A1 | 10/2008 | Tsui et al. | |
| 2009/0031312 A1 * | 1/2009 | Mausolf et al. ............... | 718/102 |
| 2009/0276519 A1 * | 11/2009 | Alimi et al. .................... | 709/224 |

FOREIGN PATENT DOCUMENTS

| | | |
|---|---|---|
| CN | 101478802 A | 7/2009 |
| JP | 2008071294 A | 3/2008 |
| WO | WO2005122680 A2 | 12/2005 |
| WO | WO2005122681 A2 | 12/2005 |

OTHER PUBLICATIONS

Wang Da-Zhen, Zhan Jun-Shan, Wan Fang, and Zhu Lei, "A Dynamic Task Scheduling Algorithm in Grid Environment", *Proceedings of the 5th WSEAS International Conference on Telecommunications and Informatics*, Istanbul, Turkey, May 27-29, 2006 (pp. 273-275).

Yan Cao, Yanli Yang, Huamin Wang, and Lina Yang, "Intelligent Job Shop Scheduling Based on MAS and Integrated Routing Wasp Algorithm and Scheduling Wasp Algorithm", *Journal of Software*, vol. 4, No. 5, Jul. 2009.

H. Kurdi, M. Li, H. Al-Raweshidy, "A Generic Framework for Resource Scheduling in Personal Mobile Grids based on Honeybee Colony", *Proc. of IEEE NGMAST'08*, Sep. 16-19, 2008, Cardiff, UK.

H. Kurdi, M. Li, H. S. Al-Raweshidy, "HoPe: A Honeybee Inspired Resource Scheduling Heuristic for Personal Mobile Grids", *Proc. of SiiC08*, Jun. 9-10, 2008, Leeds, UK.

* cited by examiner

*Primary Examiner* — Emerson Puente
*Assistant Examiner* — Adam Lee
(74) *Attorney, Agent, or Firm* — Richard C. Litman

(57) ABSTRACT

The method of forming a personal mobile grid system and resource scheduling thereon provides for the formation of a personal network, a personal area network or the like having a computational grid superimposed thereon. Resource scheduling in the personal mobile grid is performed through an optimization model based upon the nectar acquisition process of honeybees.

3 Claims, 9 Drawing Sheets

METHOD OF FORMING A PERSONAL MOBILE GRID SYSTEM AND RESOURCE SCHEDULING THEREON

BACKGROUND OF THE INVENTION

1. Field of the Invention

The present invention relates to networking of personal computing devices, and particularly to a method of forming a personal mobile grid system and resource scheduling thereon that provides for connecting all devices in a user's personal area network in a grid system for combining processing power and RAM or volatile memory when needed, and to an algorithm for resource sharing based upon the model of the honeybee that optimally allocates available resources in the grid when more computational power is need than is available on a single device in the grid.

2. Description of the Related Art

With the advent of cellular and wireless technologies, many users commonly utilize personal area networks (PANs), composed of multiple devices (such as cellular telephones, laptop computers with wireless connections, personal digital assistants (PDAs) and the like) that are able to communicate with each other through a network. Additionally, such personal area networks are often networked with additional devices, such as home or office computers, or mobile devices located in vehicles, to form personal networks (PNs).

PANs and PNs are most commonly used for applications involving data and peripheral sharing. This is due to the resources allowed for sharing in PNs, PANs and other conventional networks being limited to data, peripherals and secondary storage. The most important resources, namely, processor cycles and runtime memories, are presently not available for sharing across such networks. It would obviously be desirable to further enable these networks to seamlessly share other resources, such as processing cycles, storage capacity and functionality in the form of services available across computational grids. Since PNs can already share data, peripherals and secondary storage among their devices, the next logical step is to superimpose grid functionality over them to allow the sharing of processor cycles and memories. Thus, the net result is a huge virtual computer that can be accessed at anytime from anywhere.

Generally, two approaches have emerged in utilizing mobile devices in grid environments. In the first approach, mobile devices serve as interfaces to stationary grids in order to send requests and receive results. Thus, a mobile device is merely playing the role of a resource consumer. This approach is sometimes referred to as "mobile access to grid infrastructure" or a "Mobile Access Grid" (MAG). In the second approach, mobile devices actively participate in the grid by providing computational or data services. Thus, a mobile device can play the roles of both a resource provider and resource consumer. This approach is typically referred to as a "Mobile Grid" (MG).

In Mobile Grids and Mobile Access Grids, the mobile devices are commonly integrated with the grid infrastructure using a proxy between the stationary grid and mobile devices. Caches may be used to cope with the disconnectivity problem of mobile devices where operations on files are logged and then automatically applied when a client reconnects. In Mobile Ad hoc Grids (MAHGs), grid nodes usually exchange services in a pure peer-to-peer (P2P) scheme. This may be performed using intelligent agents or a mobile grid middleware system.

FIG. 2 illustrates the basic architecture of a typical PN. In the connectivity level (the lowest level shown in FIG. 2), devices are grouped into various radio domains based on their radio interfaces. A radio domain is a group of devices having a common radio interface and a single Medium Access Control (MAC) mechanism, and that are in direct communication range of each other. In the network level (the middle level in FIG. 2), devices within radio domains identified in the connectivity level are grouped into clusters based on a pre-established trust relationship. This trust relationship is very important to differentiate between personal nodes and devices and foreign nodes and devices. It is important to note that this trust relationship not only takes into account devices owned by the user, but also other devices with long-term trust relationships, such as family devices and devices from one's place of employment. The main function of this level is to separate communications among nodes of the same user from communications of other nodes. The service level is the highest level in the PN architecture. It contains all services offered by nodes in the Network Level. There are two types of services: public and private services. Public services are offered by both foreign and personal nodes and can be consumed by both. On the other hand, private services are offered and consumed by personal nodes only. While private services require establishing a long-term trust relationship, pubic services require a short-term trust relationship only. The service level contains all protocols related to service discovery and name servers.

A typical PN consists of a PAN, with the owner at its core. The PAN includes a set of personal nodes and devices around a person sharing a common trust relationship and communicating with others without relying on any foreign nodes or devices. The PN also includes clusters, PN nodes, PN devices, gateway nodes, a PN agent, and an interconnecting structure. A cluster is a set of personal nodes and devices that share a common trust relationship and can communicate with each other without relying on any foreign nodes or devices. In each cluster/PAN, PN nodes communicate with each other using the IP protocol. PN nodes have multiple air interfaces to connect to other PN nodes and devices. PN devices are devices that do not have IP capabilities. They are connected to other PN nodes and devices via a PN node. A personal node in a cluster/PAN does not operate in a stand-alone network. It needs to communicate with other nodes in remote clusters.

Therefore, a gateway node with special features and functionalities, such as local storage and multiple network interfaces, address translation, tunnels set up and maintenance, and traffic filtering, among others, is employed to link PN nodes to remote and foreign nodes. Gateway nodes are usually selected as powerful devices, as their tasks are quite load intensive. For gateway nodes to locate other gateway nodes in remote clusters and establish tunnels, the PN agent is used to provide additional services, such as naming and service discovery. The PN agent serves also as the entry point for PN to PN communication. It is important to add that the PN agent is not a device or node, rather it is a concept that might be implemented in different approaches. The interconnecting structure is typically a collection of overlapping networks of various technologies. A key element of a PN is the PN Provider (PNP), which offers the PN services. It provides the operational environment to manage users, services, content and network related issues.

In order for personal users to submit service requests (for example, a request for CPU cycles and memory to execute a computational job from any device available within their trusted PNs without being concerned about where, when or how these requests are executed), the grid network must utilize an efficient resource scheduler. The scheduler is responsible for automatically decomposing, allocating and executing jobs, and then finally composing final results, thus making them ready to the end user. The scheduler must preferably be lightweight, self-managed, and adaptive to cope with the dynamic nature of the grid environment.

In general terms, scheduling is a mechanism to allocate resources to jobs with the objective to optimize one or more performance measures. The mechanism belongs to a broader class of combinatorial search problems, which are concerned with finding combinations of a discrete set of items that satisfy some specified constraints. The number of possible combinations grows exponentially with the size of the problem, leading to potentially lengthy solution times and severely limiting the feasible size of such problems. Thus, scheduling is among the most difficult of common computational problems.

In reference to scheduling, a "resource" is anything that is required to carry on an operation, and includes such items as machines, processors and runways. A "job" is anything that consumes resources. A job usually consists of a single set of multiple tasks. A job can be a manufacturing process, a computer program, a landing or take-off, etc. A "task" is an atomic operation to be performed on a resource, and a "performance metric", also known as the "objective function", is the objective under consideration, such as the minimization of the makespan or maximization of the throughput. In essence, a schedule is a mapping between tasks and resources. With regard to the present system and method, the terms "resources" and "jobs" are mainly used to refer to resources and jobs associated with computers, such as processors and application programs.

Resource scheduling systems deal with four main entities: jobs, resources, performance metrics and a scheduler. In solving a scheduling problem, four questions are usually considered: How do resource characteristics affect the scheduling decision; how do job characteristics affect the scheduling decision; what performance measures should a scheduler use to determine the quality of a schedule; and which scheduler (policy, architecture and procedure) gives best (or good) results based on the previous three concerns?

The characteristics of underlying resources are critical for making a scheduling decision. For a scheduler to make a decision, it needs to know whether resources are of the same type or of different types, and the characteristics of each resource. Accordingly, two main resource models are commonly utilized: parallel and dedicated resources. Parallel resources are capable of performing the same functions. They are categorized further based on their speed as identical, uniform and unrelated resources. In contrast, dedicated resources are specialized in executing certain tasks only. Three distinguishable scheduling models are identified based on the order in which these tasks follow inside the system: flow shop, open shop and job shop scheduling models.

Identical resources are parallel resources with equal processing speeds. Uniform resources are parallel resources but with different processing speeds. However, the speed of each uniform resource is constant for all types of jobs. In contrast, each unrelated resource has a variant speed associated with each type of job. With regard to the flow shop, open shop and job shop scheduling models, these three scheduling models are based on the order in which jobs visit dedicated resources. In the flow shop scheduling model, each job is executed on all machines following a certain order. In the open shop model, each job is processed once on each machine with no constraint about the order of processing. In the job shop model, a job can be processed on more than one machine and has its own order in visiting machines.

The job model has a significant impact on the scheduling decision. For a scheduler to make a decision, it needs to know: The characteristics of each job in terms of its internal structure; and the amount and type of interaction it requires with other jobs or with the running environment. Based on this information, jobs are classified into two main categories: non-independent jobs and independent jobs. Dependent jobs, often referred to as "workflows", are coarse-grained applications constructed from a sequence of components (i.e., tasks). Tasks themselves are considered heterogeneous in nature; they might be sequential or parallel having different behavior and resource requirements. Workflows vary in their internal structure, and there are two categories: directed acyclic graph (DAG) workflows and non-DAG workflows.

An independent job represents an application that is composed of a set of tasks having no communication, dependencies or synchronization among them. These tasks can be executed in any order since each task does not require any input from any other task. In other words, the output of any task would never be fed to another task as an input. However, multiple tasks can share the same input file(s) and they may also share the same output file(s). These applications are easy to parallelize by decomposing them into multiple tasks of lower granularity. From a theoretical perspective, an independent job model is a generalization of the pre-emptive execution model that allows for simultaneous execution of different parts of the same job on different machines. Applications conforming to this model arise in many fields of science and engineering, such as image processing, Monte Carlo simulations, data mining and database searching. There are two possible models for independent jobs based on the task granularity: Bag-of-Tasks (BoT) and Divisible Load (DL).

In DAG workflows, the internal structure of a workflow is represented by a DAG. Nodes of the graph represent tasks while edges represent dependencies between tasks. The simplest workflow applications can be represented with a simple DAG in which tasks are performed in a specific linear order. At the second level of complexity are workflows that are modeled using non-linear DAG. Some scientific applications require an iteration structure; in this case, workflows are modeled with cyclic graphs and are called non-DAG workflows. In the most complicated level of workflows, it is even difficult to find an appropriate graph model for the workflow. In this case, an application is modeled as a workflow of workflows.

Independent jobs can be composed of coarse-grained components, which are known as Bag-of-Tasks (BoT), or fine-grained components, which are known as Divisible Loads (DL). BoT jobs are also known as "parameter-sweep applications". A BoT is a coarse-grained application consisting of computations that can be divided into a finite number of independent pieces (tasks). The number of tasks and the task size of each application are set in advance. In this case, the scheduling problem is normally considered as a bin packing problem. This problem is considered to be NP-hard and is usually approached by means of heuristics.

DL applications, also known as fine-grained applications, consist of computations or loads that can be arbitrarily divided into independent chunks (i.e., tasks). This corresponds to a perfectly parallel job: any task can itself be further decomposed into independent sub-tasks. A DL model is an approximation of job models that are built out of a large number of identical, low granularity components. This has the potential to provide a practical platform for scheduling in heterogeneous environments.

Performance metrics, also known as scheduling objectives, can be viewed from two different and competing perspectives: the user or consumer perspective (i.e., "job-centric" metrics) and the provider perspective (i.e., "resource-centric" metrics). Job-centric metrics represent the user or consumer perspective. They seek to optimize the performance of each individual job, such as the turnaround time (also known as "flow time", "response time" or "completion time"), which represents the time taken from when a job enters the system until it finishes execution. Job-centric metrics are related to the system performance, which encompasses how well system resources are being used for the benefit of each user of the system.

Resource-centric metrics seek to optimize the system efficiency, such as throughput, resource utilization and makespan (i.e., the total time required for completing all jobs in a set). The system efficiency is concerned with how efficiently resources are utilized for the benefit of all users of the system, as well as the added overhead associated with the resource scheduling process. As job-centric and resource-centric metrics are competitive, there are always tradeoffs to consider. Therefore, hybrid approaches, such as economy-based metrics, have been utilized. Economy-based metrics consider both job (resource consumer) and resource (resource provider) perspectives at the same time, but from the market economy point of view. For the market to be competitive, resource providers need to set reasonable prices to keep the supply of a service equal to its demand. However, applying these metrics requires that the whole system is built initially with the economic model as a reference model.

A "scheduler model" describes the organization, policy and procedure of a resource scheduler. Scheduler "organization" refers to the way that entities involved in the scheduling process interact with each other. This organization has a critical influence on the efficiency of the scheduling process. In centralized schedulers, a single entity has the authority to make the scheduling decision; it makes the decision for the whole system regarding who should run what and when. This organization has the advantages of simplified management and deployment. Among the main disadvantages of such a scheduler are the lack of fault tolerance, poor scalability and difficulty in accommodating multiple policies. In decentralized schedulers, the scheduling authority is shared among the multiple entities of a resource management system. This organization eases scaling to large systems and is more fault tolerant if proper coordination is shouldered by the different schedulers.

In non-distributed schedulers, the responsibility for executing the scheduling policy physically resides in a single entity, whereas in distributed schedulers, this responsibility is shouldered by physically distributed entities. When the responsibility for making and carrying out policy decisions is shared among entities in a system, the scheduler is "distributed". On the other hand, when the authority of making the scheduling decisions is distributed to the system entities, the scheduler is "decentralized". Distributed schedulers can be classified further, based on the way an individual processor makes decisions, while executing the scheduling policy, into: cooperative and non-cooperative schedulers. In non-cooperative schedulers, individual entities act alone as autonomous agents and arrive at the scheduling decision independently of the action of other entities in the system. In cooperative schedulers, each entity has the responsibility to carry out its own portion of the scheduling task, but all entities are working toward a system wide goal.

A "scheduling policy" consists of a set of general features describing the scheduling process. Based on the way information about jobs and resources is generated, one can differentiate between deterministic and stochastic policies. In stochastic scheduling, job information, such as the processing time, is unknown in advance, but it is known to be a random selection of a given probability distribution. The actual information only becomes known when the processing has been completed. Stochastic scheduling is used where either the number of individuals is small or where there is reason to expect random events to have an important influence on the behavior of the system. Deterministic scheduling takes no account of random variation and therefore gives a fixed and precisely reproducible result, as opposed to stochastic scheduling, where different outcomes can result from the same initial conditions. However, it does not require that all job information is known in advance. Rather, it also considers problems where some job parameters are unknown in advance, such as non-clairvoyant and dynamic scheduling.

Among the significant factors that affect the scheduling decision are the volume and type of information available to the scheduler. Greater volumes of information about jobs, such as the number of jobs, their processing times and release dates can result in an optimum schedule. However, such information may not be available or may be too expensive to collect. Further, increasing the amount of information processed by a scheduler usually increases the time to produce a schedule. Therefore, two contrasting scheduling policies can be addressed based on the availability, or necessity, of such information: clairvoyant and non-clairvoyant scheduling.

In a clairvoyant scheduling policy, it is assumed that job characteristics, such as execution time and release dates, are available to the scheduler before the scheduling decision takes place; i.e., either before jobs enter the system (i.e., static scheduling) or just before starting their execution (i.e., dynamic scheduling). This assumption, however, is not valid for most real world processors. In contrast, a non-clairvoyant scheduling policy assumes and requires no prior knowledge about job or resource characteristics. This information might only be available after a job has been executed.

Within the realm of dynamic scheduling policies, two approaches can be identified based on when the scheduling decision takes place: immediate and batch policies. An immediate mode policy maps a job to a machine upon task arrival, whereas a batch mode scheduling policy is event driven. Thus, when a specified condition is satisfied, such as a certain number of tasks, or a time period elapsed, scheduling occurs. In an adaptive scheduling policy, the scheduling algorithm or parameters are dynamically modified according to the change in the system state. In a non-adaptive scheduling policy, the current system state has no influence on the scheduling policy. In a dynamic policy, part of the information about jobs and resources is revealed dynamically, thus schedules are generated in the same manner. However, this does not necessarily imply that the scheduling algorithm or parameters are dynamic as well, which is the case in adaptive scheduling policies.

In general, decisions about mapping tasks to resources can be made at two levels: the local level and global level. In a local scheduling policy, decisions are made based only on the job (sometimes a group of jobs or a sub-workflow) at hand. In a global scheduling policy, decisions are made based on all non-scheduled jobs (including jobs not yet started or the whole workflow). The main advantage of global policy schedulers, also known as "meta-schedulers", is that they can provide a better overall result. On the other hand, making the scheduling decision takes a much longer time than with local policies. Thus, the overhead produced by a global policy can reduce the overall benefit and possibly exceed its benefits.

A schedule might offer the best performance for a job at its start but, over time, other jobs may introduce load into the system, or job requirements may change. To sustain good performance, high Quality of Service (QoS) and fault tolerance for long running jobs and real-time applications, schedulers usually include additional features, such as pre-emption, rescheduling, co-scheduling and resource reservation, to support such applications. A pre-emptive scheduling policy may block a job after it has started execution and resume it later on the same or a different machine. A rescheduling policy allows changing the machine on which a job is running (i.e., "migration"). It also allows swapping between jobs when a certain event occurs, such as new job arrival or machine down. In a co-scheduling policy, related jobs of an application are scheduled to run on different machines at the same time. Co-scheduling techniques rely on the communication behavior of the application to schedule the communicating jobs simultaneously. In a resource reservation policy, a job is allowed to reserve required resources even before having the job entering the system so it can ensure resource availability.

"Scheduling procedure" refers to the scheduling algorithm that implements the scheduling policy. Scheduling algorithms include both optimum and sub-optimum algorithms. An approximation algorithm uses the same formal computational model used by an optimum algorithm, but instead of searching the entire solution space for an optimum solution, the algorithm is satisfied when a "good" solution is found. This technique is used to decrease the time taken to find an acceptable solution (i.e., a schedule). In the case of heuristics, empirical data analysis is used to look for a "good" solution. A "heuristic" is a collection of rules or steps that guide one toward a solution that may or may not be optimal. Examples include greedy algorithms, Tabu search and simulated annealing. Approximation algorithms and heuristics are distinguished by performance guarantee and evaluation. An approximation algorithm usually has a theoretical performance guarantee; for example, the solution it calculates is ten percent worse than the best solution. On the other hand, a heuristic will usually have no performance guarantee, but its solution is intuitively close to the best solution.

A "grid" is a collection of computational resources that are coupled together to solve a single large problem that cannot be solved on any single one of these resources. Thus, a specialized resource management system must be employed to mitigate the complexity of managing such a large number of distrusted heterogeneous resources. Many current grid systems employ centralized schedulers to simplify the resource management process and ensure full control over resources. There are also hierarchical schedulers at several different layers with a grid scheduler (i.e., a "metascheduler") at the highest level, a local scheduler (i.e., a "cluster scheduler") at the lowest level, and other layers may exist in between. Both schemes are based on the assumption that a detailed system state is available to schedulers, which is highly expensive, considerably restricts the scalability of the system and generally unrealistic in many grid environments due to their dynamic nature.

Virtually all present grid systems employ clairvoyant scheduling policies assuming prior availability of information about incoming jobs, such as execution times and release dates. Additionally, static schedules are usually generated in advance, which is generally unrealistic in dynamic environments and severely restricts the system flexibility. Most grid resources are shared among several users or are available to grid usage only during idle cycles, dramatically affecting the predictability of resource availability. Grid computing applications are sometimes run in background mode or as a screen saver, only when the system is idle. In such a case, the resource is not "dedicated", meaning that it is not exclusively devoted to grid utilization. A dedicated resource usually receives jobs from a single scheduler, in contrast to non-dedicated resources, which receive workloads from multiple schedulers.

In order to efficiently schedule a personal mobile grid, a resource scheduler should be self-scheduling and cooperative, in order to conceal the resource management complexity from the personal user, as well as being decentralized, local and adaptive, in order to cope with the highly dynamic environment, and should further be non-clairvoyant, in order to handle the unpredictability of incoming jobs.

Thus, a method of forming a personal mobile grid system and resource scheduling thereon solving the aforementioned problems is desired.

SUMMARY OF THE INVENTION

The method of forming a personal mobile grid system and resource scheduling thereon utilizes a honeybee-based resource scheduling model, thus providing for the formation of personal area networks, personal networks and the like with network grid functionality superimposed thereon, allowing for the network sharing of resources, such as processor cycles and memories. The personal mobile grid system is a grid computer environment that can be owned and utilized by an individual user. The grid system is constructed over the user's networked devices and may further be extended to other devices that the user trusts. The personal mobile grid system enables the mobility of users requesting access to grid resources, as well as resources that are part of the grid.

In contrast to conventional grid systems, the personal mobile grid is primarily constructed, owned and utilized by an individual user (or a group of individual users with a mutual trust relationship). Traditional grid networks are constructed, owned and utilized by organizations and other large entities. Traditional grids are typically concerned with a large user population, whereas the personal mobile grid system is primarily concerned with a single user. Further, whereas traditional grids require a well-established stationary infrastructure to operate, the personal mobile grid system can be fully accommodated on mobile devices connected via a PN.

The personal mobile grid is based on PN architecture and arises as a natural extension to the PN, applying scalability, pervasiveness and ubiquity, transparency and user centricity to the grid design. The personal mobile grid is substantially a superset of PNs. The personal mobile grid may be viewed as a PN with additional resources for sharing, such as the sharing of CPU cycles and run-time memories, which allows for additional public and private services.

Building on conventional PN architecture, the personal mobile grid adds a personal mobile grid level to the conventional connectivity, network, and service levels. The personal mobile grid level serves as a virtualization layer to hide the complexity of harnessing the heterogeneous underlying computational resources from the end user. In this level, resources available from the network level are grouped into two main categories: personal resources residing inside the personal mobile grid, and foreign resources residing outside of the grid.

The method includes the following steps: (a) forming a computational grid network from a plurality of networked devices; and (b) dividing the plurality of networked devices into a plurality of task executers and a plurality of task composers.

Each executer performs the following steps (c) through (o): (c) determining if a non-empty workspace exists in the computational grid network; (d) if a non-empty workspace exists, then contacting the non-empty workspace; (e) if a non-empty workspace does not exist, then determining if a composer help message has been generated by one of the task composers, and if a composer help message has been generated, then the executer transforms to a composer, and if a composer help message has not been generated, then polling an executer help list to determine if the executer help list is empty, and if the executer help list is not empty, then contacting the non-empty workspace, and if the executer help list is empty, then searching for a non-empty workspace; (f) determining if tasks are available for execution, and if no tasks are available, then returning to step (e); (g) randomly selecting a task to be executed; (h) assessing a quantity of remaining tasks in the workspace; (i) executing the task selected in step (g); (j) sending an unload request message; (k) assessing a waiting time; (l) comparing the waiting time with a waiting time threshold value, and if the waiting time is greater than the waiting time threshold value, then sending a composer help message; (m) determining if a ready message has been received, and if a ready message has been received, then sending task results of the executed task; (n) determining if a remaining workload is greater than or equal to an executer help threshold, and if the remaining workload is greater than or equal to the executer help threshold, then sending an executer help message and returning to step (d); (o) determining if the remaining workload is zero, and if the remaining workload is non-zero, then returning to step (d), and if the remaining workload is zero, then returning to step (e).

Each composer performs the following steps (p) through (q): (p) determining if any tasks have complete results, and if any tasks have complete results, then randomly selecting a complete result, composing the result and sending job results to the user, and if no tasks with complete results exist, then determining if a composer help message has been received, and if a composer help message has been received, then transforming into an executer; and (q) returning to step (p).

In more general terms, the executers and composers may be modeled on honeybee behavior, such that the method is represented by the following steps:

(a) forming a computational grid network from a plurality of networked devices;

(b) dividing the plurality of networked devices into a plurality of task executers and a plurality of task composers;

(c) modeling task execution in the plurality of task executers on the behavior of forager honeybees such that the plurality of task executers are represented as $N_c$ forager processors connected to multiple nectar queues, where $N_c$ is an integer representing the number of task executers and a task to be executed is represented as nectar to be processed, an i-th forager processor $N_i$ assigning itself an average volume of nectar load $L_c$ from a nectar queue, based on its capacity, and delivering the nectar load to a single hive queue;

(d) representing a task execution rate as a nectar collection rate and maximizing the nectar collection rate $\lambda_p$ such that $\lambda_p = aN_c$, where a is a proportionality constant greater than zero;

(e) modeling task composing in the plurality of task composers on the behavior of receiver honeybees such that the plurality of task composers are represented as $N_p$ receiver processors;

(f) representing a task composition rate as a nectar processing rate and maximizing the nectar processing rate $\mu_p$ such that $\mu_p = bN_p$, where b is a proportionality constant greater than zero;

(g) re-assigning the plurality of networked devices into an optimized plurality of task executers and an optimized plurality of task composers based upon the maximization of the task execution rater and the maximization of the task composition rate; and (h) returning to step (d).

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The method of forming a personal mobile grid system and resource scheduling thereon provides for the formation of personal area networks, personal networks and the like with network grid functionality superimposed thereon, allowing for the network sharing of resources such as processor cycles and memories. The personal mobile grid system is a grid computer environment that can be owned and utilized by an individual user. The grid system is constructed over the user's networked devices and may further be extended to other devices that the user trusts. The personal mobile grid system enables the mobility of users requesting access to grid resources, as well as resources that are part of the grid.

In contrast to conventional grid systems, the personal mobile grid is primarily constructed, owned and utilized by an individual user (or a group of individual users with a mutual trust relationship). Traditional grid networks are constructed, owned and utilized by organizations and other large entities. Traditional grids are typically concerned with a large user population, whereas the personal mobile grid system is primarily concerned with a single user. Further, whereas traditional grids require a well-established stationary infrastructure to operate, the personal mobile grid system can be fully accommodated on mobile devices connected via a PN.

The personal mobile grid is based on PN architecture and arises as a natural extension to the PN, applying scalability, pervasiveness and ubiquity, transparency and user centricity to the grid design. The personal mobile grid is substantially a superset of PNs. The personal mobile grid may be viewed as a PN with additional resources for sharing, such as the sharing of CPU cycles and run-time memories, which allows for additional public and private services.

Figure 1:
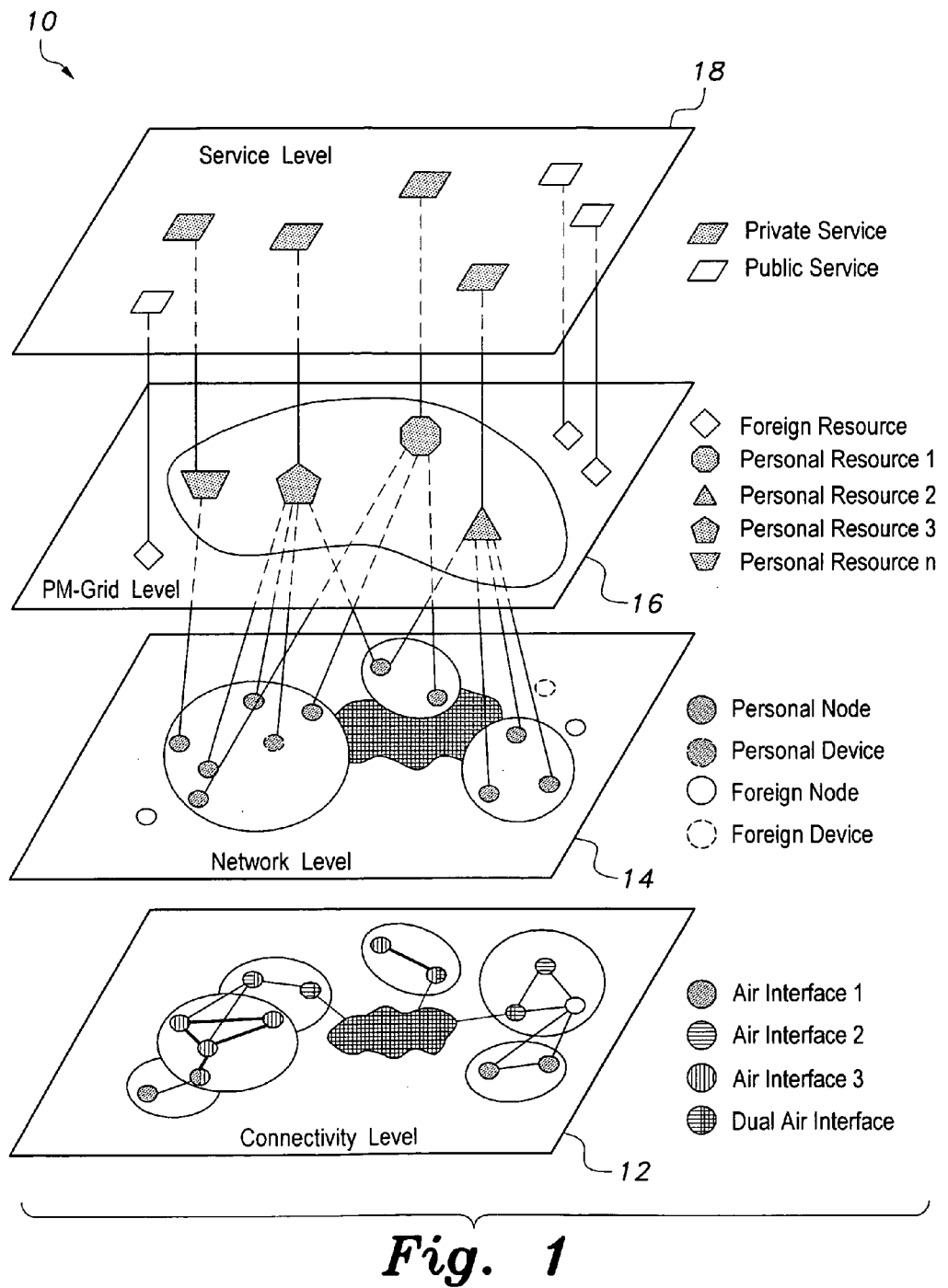
FIG. 1 is a diagrammatic overview of architecture of a personal mobile grid system according to the present invention.

FIG. 1 illustrates an overview of the architecture of the personal mobile grid system 10. Similar to the prior art PN system of FIG. 2, the personal mobile grid system 10 includes a connectivity level, in which devices are grouped into various radio domains based on their radio interfaces. A radio domain is a group of devices with a common radio interface, a single Medium Access Control (MAC) mechanism and in direct communication range of each other. In the network level 14, devices within radio domains identified in the connectivity level are grouped into clusters based on a pre-established trust relationship. This trust relationship is very important to differentiate between personal nodes and devices, and foreign nodes and devices. It is important to note that this trust relationship not only takes into account devices owned by the user, but also other devices with long-term trust relationships, such as family devices and devices from one's place of employment. The main function of this level is to separate communications among nodes of the same user from communications of other nodes.

The service level 18 is the highest level in the personal mobile grid architecture. It contains all services offered by nodes in the Network Level 14. There are two types of services: public and private services. Public services are offered by both foreign and personal nodes, and can be consumed by both. On the other hand, private services are offered and consumed by personal nodes only. While private services require establishing a long-term trust relationship, pubic services require a short-term trust relationship only. The service level 18 contains all protocols related to service discovery and name servers.

Figure 2:
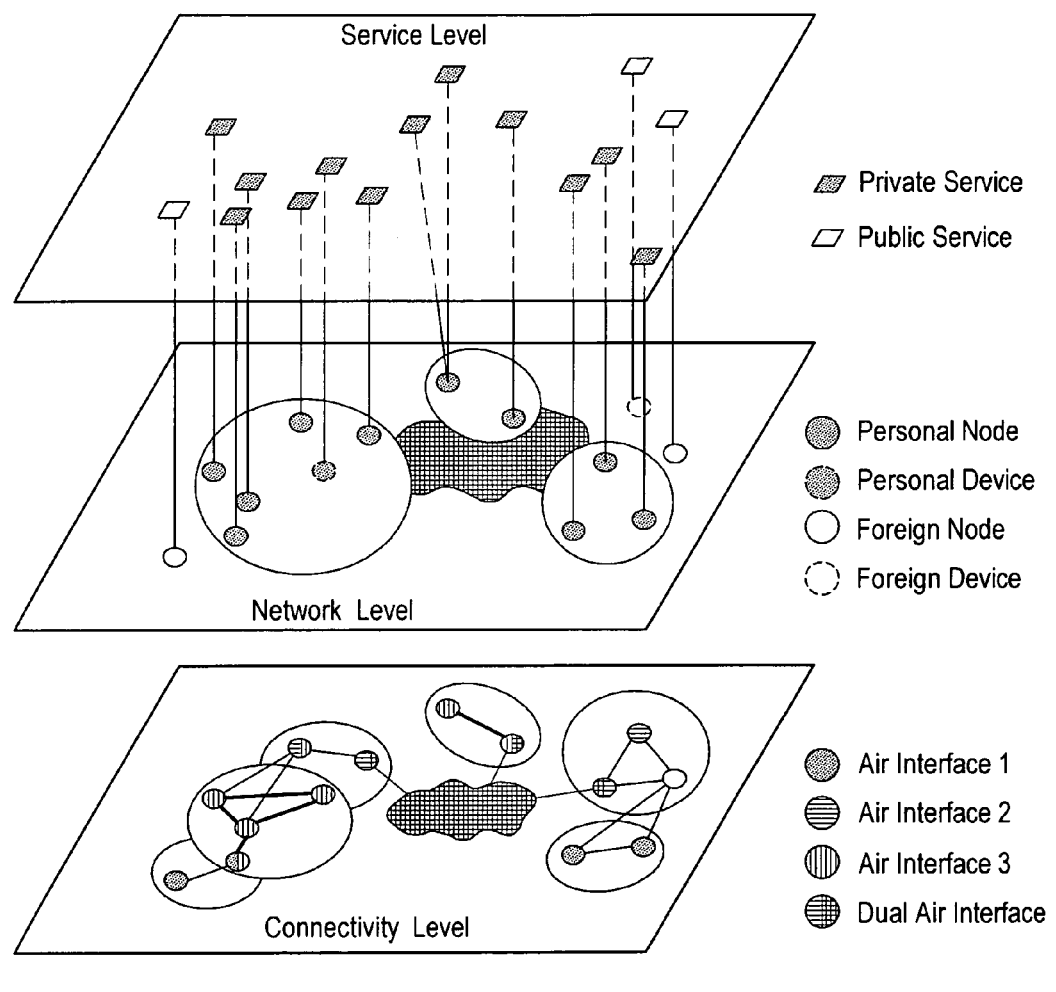
FIG. 2 is a diagrammatic overview of architecture of a typical prior art personal network system.

As opposed to the PN architecture of FIG. 2, the personal mobile grid 10 of FIG. 1 adds a personal mobile grid level 16, which serves as a virtualization layer to hide the complexity of harnessing the heterogeneous underlying computational resources from the end user. In this level, resources available from the network level are grouped into two main categories: personal resources residing inside the personal mobile grid, and foreign resources residing outside of the grid. Personal resources are grouped into larger virtual resources based on the type of functionality they provide, such as CPU cycles, storage, address book and printing. The aim is to allow personal users to submit service requests, such as a request for CPU cycles and memory to execute a computational job, from any device available within their trusted PNs without being concerned about where, when or how these requests are executed.

In order to achieve this goal, the personal mobile grid level 16 provides an efficient resource scheduler. The scheduler is responsible for automatically decomposing, allocating and executing jobs, and then finally composing final results, thus making them ready to the end user. The scheduler is lightweight, self-managed and adaptive to cope with the dynamic nature of the personal mobile grid environment. The resource scheduler, which utilizes a honeybee-based model, is described in depth below.

Figure 8:
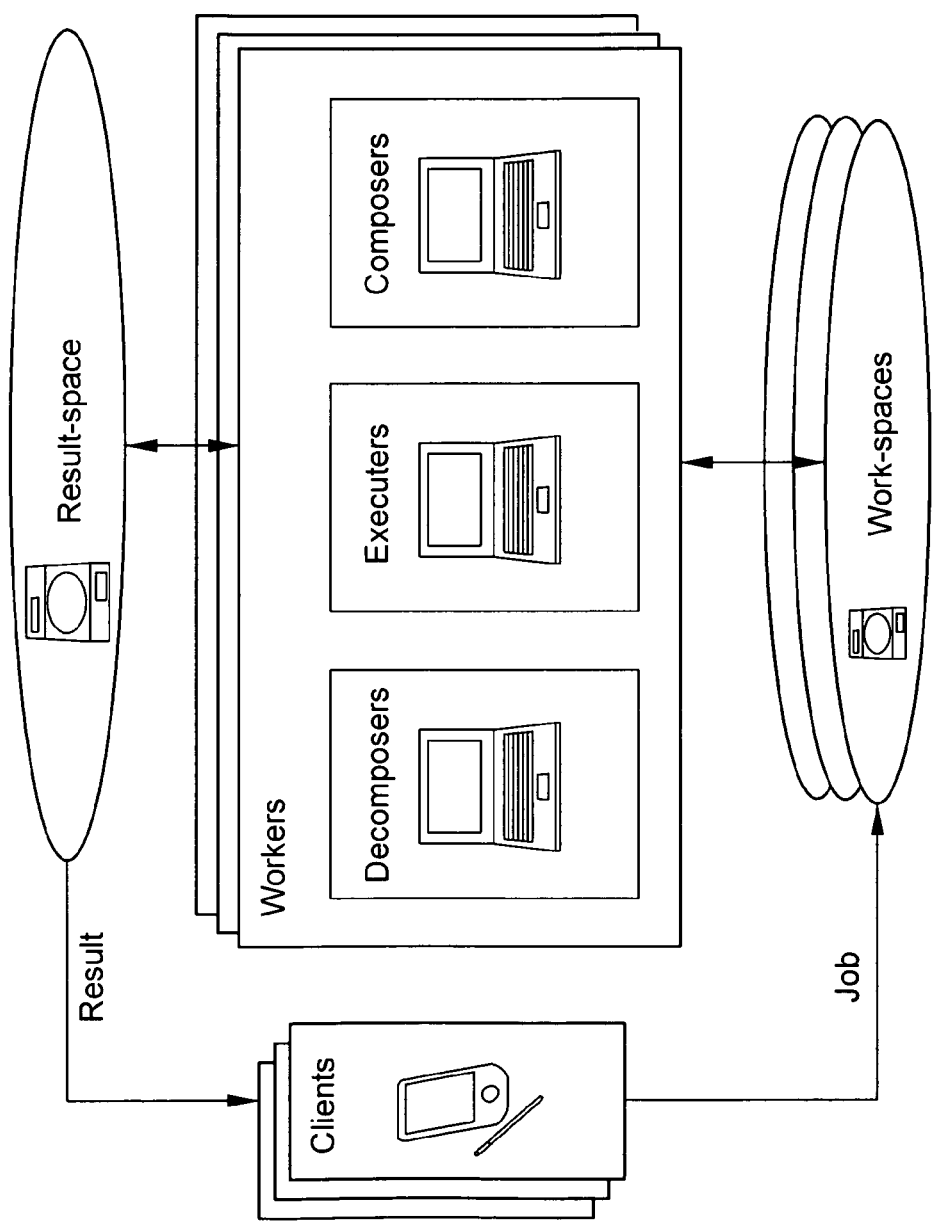
FIG. 8 is a diagrammatic overview of device division in the method of forming a personal mobile grid system and resource scheduling thereon according to the present invention.

In addition to the PN architecture elements, the personal mobile grid includes three functional elements: clients, workers and spaces. This is diagrammatically illustrated in FIG. 8. Clients represent the first category of personal mobile grid elements, consisting of a set of mobile devices, such as mobile phones, usually within the PAN, that are highly dynamic and considerably limited in terms of processing power and network bandwidth. This set can send requests for executing simple jobs, or complex computational jobs that are stored elsewhere, to more capable devices in personal mobile grids. Workers represent the second category of personal mobile grid elements, and includes a set of devices, such as laptops, that can be mobile, but are less dynamic and have better computing resources than clients. These devices can jointly complete computational jobs. They are further divided into: decomposers, executers, and composers. A decomposer is a specialized program that tests if a job might be executed in parallel. If so, it divides it into independent tasks of lower granularities. Executers are computing elements capable of executing the actual computation logic encapsulated in a job. Since jobs are decomposed into smaller tasks, and each task is executed independently of other tasks within the same job, so that there is a need to aggregate results produced after running these tasks. Composers are elements running a specialized program that compose all partial results related to a certain job into a final result to be sent to the requesting client.

Spaces represent the third category of personal mobile grid elements, and consist of a set of static storage-rich devices, typically at home or the office, such as desktops. Clients and workers communicate with each other using these spaces, which serve essentially as simple, shared memories for buffering. The use of a buffering technique is important in mobile environments in order to reduce the impact of frequent disconnections. The idea of spaces is based on Tuple-spaces. A Tuple-space is a form of independent associative memory. For example, a group of processors may be considered that produce pieces of data, along with another group of processors that consume the data. Producers post their data to the space, and consumers retrieve data from the space that matches certain criteria. In the personal mobile grid, there are two types of spaces: workspaces and the result space. Workspaces are multiple pools of jobs sent from clients. Executers access these pools, hunting for tasks to execute. The result space is a large pool holding results that are generated by executers.

Upon initialization of the personal mobile grid, each device is assigned an initial role based on its score in a Device Score (DS) formula:

$$DS = w_1 A_1 + w_2 A_2 + w_3 A_3 w_n A_n \quad (1)$$

where $A_1, A_2, A_3 \ldots A_n$ are the set of static normalized attributes relevant to the device performance, such as CPU speed, memory size, network bandwidth, immobility and remaining power in the battery, and n represents the number of devices in the network. The weighting coefficients $w_1, w_2, w_3, \ldots, w_n$ are used to describe the relative importance of the different device attributes in each role, subject to the condition:

$$\sum_{i=1}^{n} w_i = 1 \quad (2)$$

where $w_1, w_2, \ldots, w_n$ 24 0.

At the operation time, a device might be promoted (i.e., assigned a higher role in the personal mobile grid roles hierarchy) based on the device score in the DS formula after substituting $A_1, A_2, A_3, \ldots, A_n$ by the device dynamic attributes, such as current CPU load, available memory and battery consumption. For example, a laptop with a low battery might be promoted to a client.

Device roles in the personal mobile grid are logically separated, but physically might not be, so that there might be more than one of these elements located within one physical device. In relation to PN elements, spaces are more likely to be located in gateway nodes, as these nodes are usually powerful stationary devices, such as desktops. The most powerful stationary device, in which the PN agent is usually located, is specifically chosen to accommodate the result space. Workers are located in PN nodes, as these devices usually have reasonable processing capabilities and multiple air interfaces, such as laptops. Clients are located in PN devices, which usually have the least resources. The placement of personal mobile grid elements in relation to PN element is summarized in Table 1:

TABLE 1

Relation between MG and PN elements

| Personal Mobile Grid Elements | PN Elements |
| --- | --- |
| Spaces | Gateway Nodes |
| Workers | PN Nodes |
| Clients | PN Devices |

Figure 3:
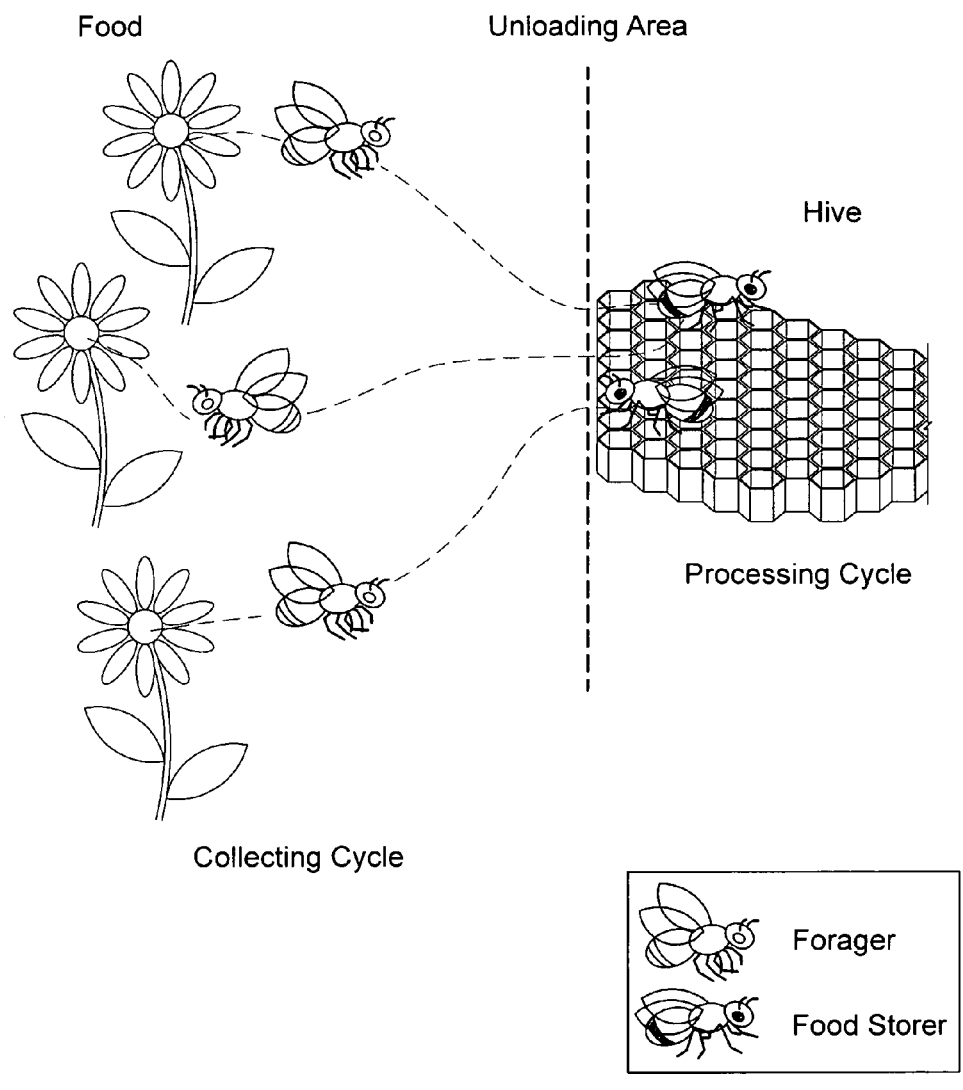
FIG. 3 is a diagrammatic illustration of a nectar acquisition process of honeybees, used to model resource scheduling in the personal mobile grid system of FIG. 1.

Resource scheduling for the personal mobile grid is preferably performed utilizing a honeybee colony-based scheduling model. Colonies of social insects, such as ants and bees, present an intelligent collective behavior, although they are composed of simple individuals of limited capabilities. These intelligent systems from nature have inspired the research discipline commonly referred to as "Swarm Intelligence" (SI), which studies how intelligent global behavior can be based upon a population of simple agents interacting locally with one another in a decentralized, self-organized manner. Among all social systems, the social physiology underlying the food collection process of honeybee colonies might be the greatest metaphor of cooperative group functioning outside the realm of human society. Honeybee colonies possess division of labor between the foragers, who work in the field collecting the nectar, and the food-storers, who work in the hive processing the newly gathered nectar, as illustrated in FIG. 3.

This organization boosts the efficiency of the colony, but requires coordination of the two labor groups in order to keep the rates of the collecting and processing in balance. This problem of coordination is a major one, since a colony experiences large and unpredictable variations from day to day in its rate of incoming nectar. A colony adjusts its collecting rate with respect to external nectar supply through changes in each forager's rate of foraging trips and the number of foragers through the "waggle dance", a behavior performed by foragers returning from rich food sources in which the bee runs through a small octagon-like pattern.

The direction and duration of this dance is closely correlated with direction and quantity of nectar of the flower patch being advertised by the dancing bee. When a colony's collecting rate increases markedly so that its nectar foragers must conduct long searches to find food-storers upon return to the hive, the foragers perform the "tremble dance", a behavior performed by foragers in which the bee walks slowly about the nest, constantly making trembling movements to boost the number of bees engaged in the task of nectar processing. The duration of this dance is closely correlated with the search time experienced by the dancing bee. The basic steps followed by a forager and a food-storer are shown in FIGS. 4A and 4B, respectively.

Figure 4A:
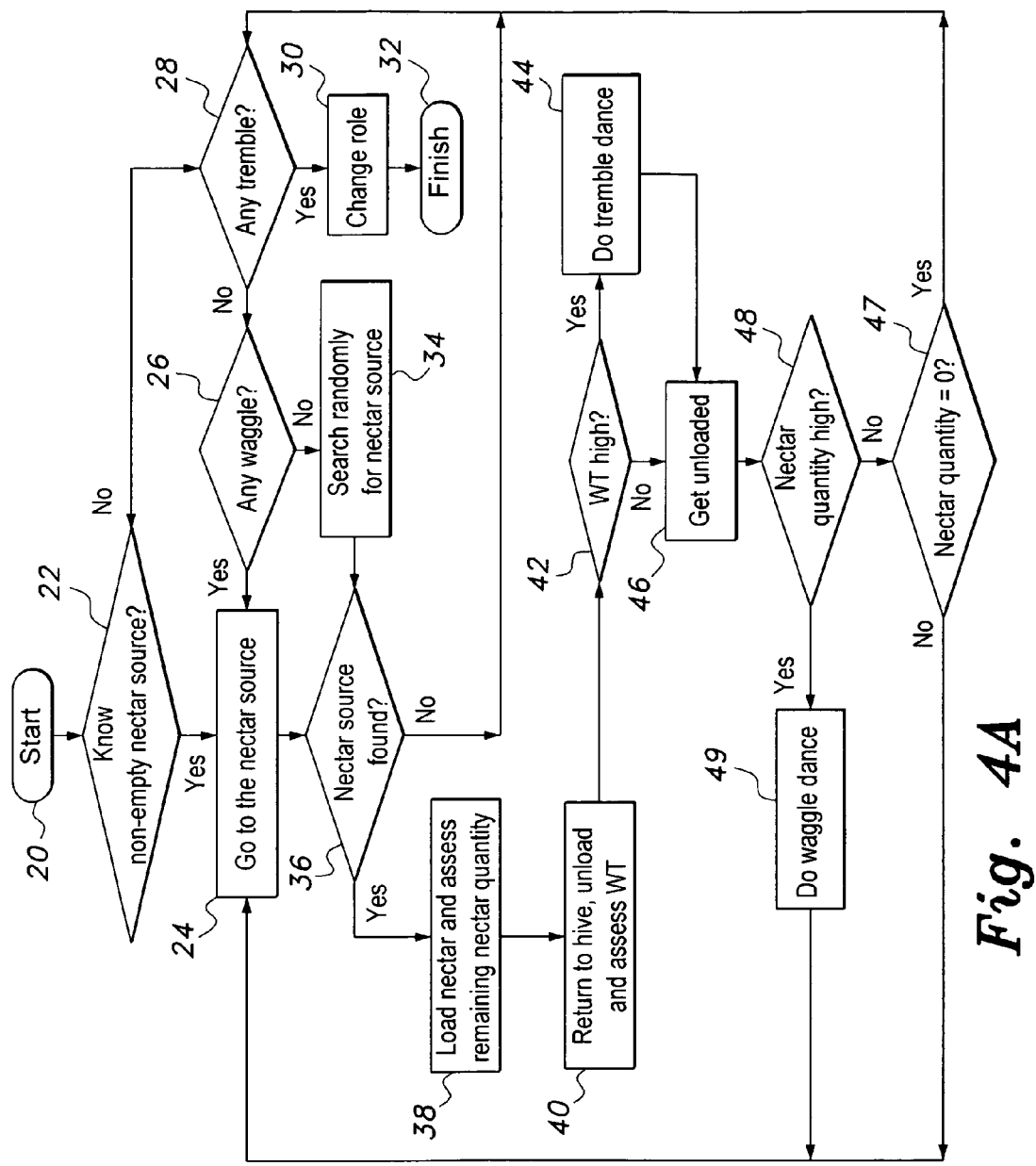
FIG. 4A is a flowchart illustrating foraging steps in the nectar acquisition process of FIG. 3.

In FIG. 4A, the forager bee's portion of the process begins at step 20. If a nectar source (NS) is already known (with the determination being made at step 22), then the forager goes to the nectar source at step 24. If a nectar source is not already known, then observation for a tremble dance is made at step 28. If a tremble dance is seen, then the forager changes roles at step 30, becoming a receiver bee and the process ends at step 32. If a tremble dance is not seen at step 28, then a determination is made at step 26 if a waggle dance is observed. If a waggle dance is seen, then the forager proceeds to the nectar source at step 24. If no waggle dance is seen, then the forager bee searches randomly for a nectar source at step 34 and proceeds to step 36, in which it is determined if a nectar source has been found. Alternatively, from step 24, the forager bee's process also goes to step 36. If no nectar source is found, then flow returns to step 28. If a nectar source is found, then the nectar is loaded and the remaining nectar quantity is assessed at step 38. The forager bee then returns to the hive, unloads the nectar and assesses the waiting time (WT), all at step 40. If the waiting time is relatively high, then the forager bee performs a tremble dance at step 44 and the nectar is unloaded at step 46. If the wait time is not high, then the nectar is directly unloaded at step 46. A determination as to the quantity of the nectar is made at step 48, and if the quantity is relatively high, then the forager bee performs a waggle dance at step 49 and returns to step 24. If the quantity is not high, then it is determined if the quantity is approximately equal to zero at step 47. If not, then flow returns to step 24. If so, then flow returns to step 28.

Figure 4B:
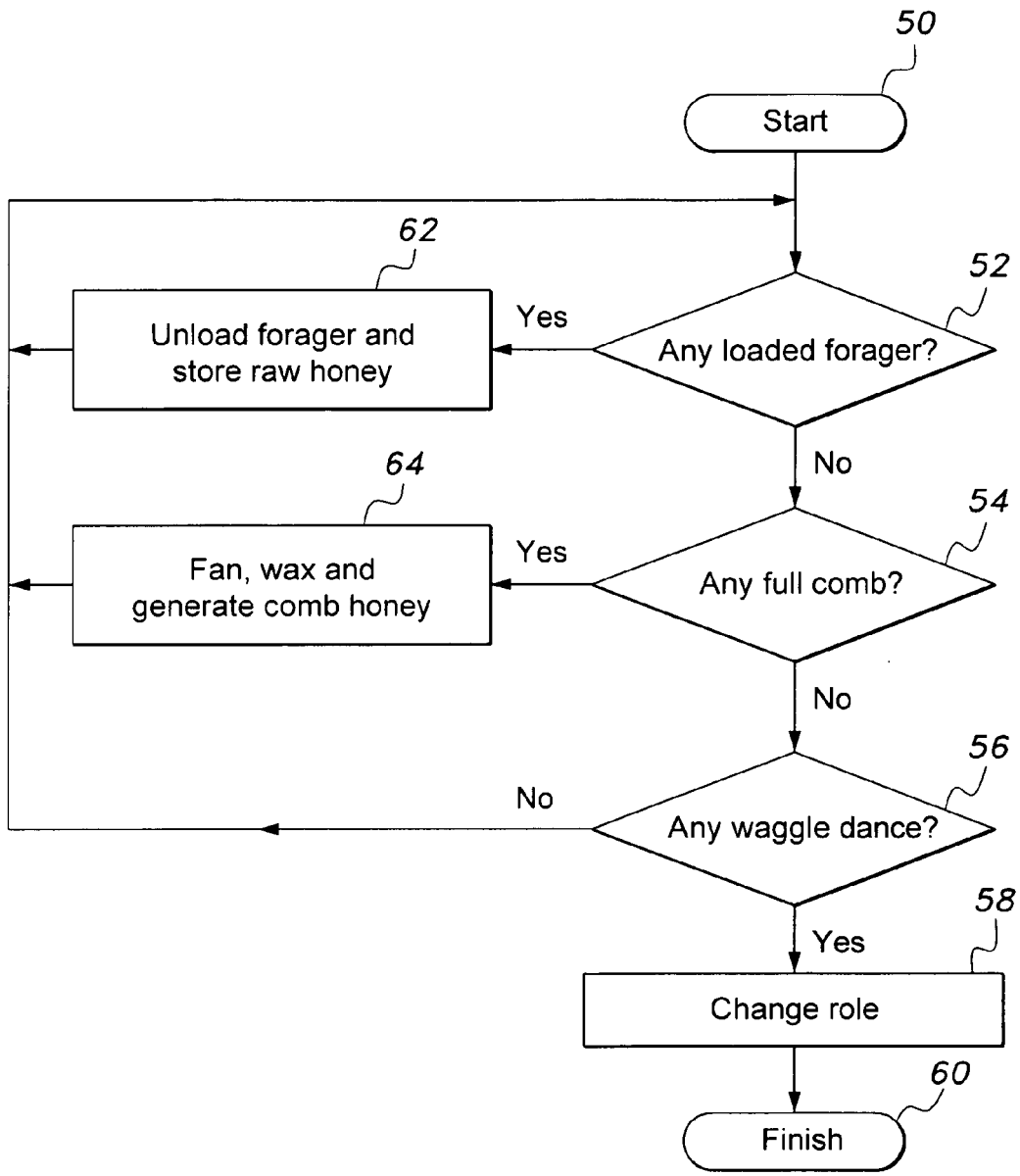
FIG. 4B is a flowchart illustrating food-storing steps in the nectar acquisition process of FIG. 3.

In FIG. 4B, the food-storer, or receiver, bee begins its process at step 50. A determination is made at step 52 as whether there is a loaded forager. If a loaded forager is present, then the receiver bee unloads the forager and stores the raw honey at step 62. The process then begins again at step 52. If a loaded forager is not present, then a determination is made at 54 as to whether any honey combs are full. If so, then the receiver bee fans, waxes and generates comb honey at step 64, with the process then starting again at step 52. If there is not a full honey comb, then a determination is made at step 56 as to whether a waggle dance is observed. If not, the process begins again at step 52. If so, then the receiver bee changes roles at step 58, becoming a forager bee, and the process ends at step 60.

Conventional dynamic approaches to grid scheduling are difficult to execute. This is because, for practical purposes, a very limited amount of knowledge is available about the system during runtime. Obtaining a clear picture about the system is significantly difficult and exposes the system security to high risks. Furthermore, in unpredictable and constantly changing systems, reliance on dedicated entities, such as schedulers or master nodes, needs to be avoided. Thus, distributed self-managed schedulers are found to be the most feasible schedulers for grid environments. Therefore, the present method utilizes a resource scheduler inspired by the foraging behavior of honeybees, in which the grid environment is viewed as a resource-rich environment with collaborative agents and a fully distributed scheduling scheme, rather than present conventional centralized schedulers.

An analysis of a bee colony's food foraging process shows an extraordinary economy of communication among the bees involved in food collection via their shared environment, which is closely analogous to the indirect data transfer among a group of processors via a shared memory. Therefore, it is natural to utilize the principles behind bee communication to develop a scheduling framework for the purpose of tackling the grid resource scheduling problem in personal mobile grid environments. The machine and forager allocation problems are similar, and the present scheduling system and method provides a mapping between the two problems.

In the same manner that honeybees show division of labor in which different bees specialize in different tasks, all mobile devices available to the personal mobile grid are assigned roles according to their resource capabilities. Referring again to FIG. 8, clients, such as mobile phones and PDAs, are devices with the least built-in resources. They are used mainly as job producers and consumers. Spaces are devices with better storage resources than clients, e.g., media players. They serve as a simple associative memory or a distributed object space. Entities communicate with each other using these spaces. Spaces are further divided into workspaces, where requests from clients and tasks from decomposers are available, and a space that contains initial results produced by workers and final results generated by composers. While there are several workspaces, the result space is unique, but might be replicated, if needed. Workspaces and the result space are analogs to important places to a honeybee colony, i.e., food sources and the hive, respectively. Workers, e.g., laptop and desktop computers, are the most powerful devices in the system. They are subdivided into decomposers, executers and composers.

A decomposer is a device running a specialized program that tests if a service might be executed in parallel, and, if so, it divides it into independent tasks. An executer is a device that executes the actual computation logic encapsulated in the job request. Composers are devices running a specialized program that collects all initial results related to a certain user request and composes them into a final result message to be sent to the requesting client. In the honeybee analogy, executers and composers correspond to foragers and food-storers, respectively. Decomposers are used to partition jobs into smaller tasks to be suitable for executers' capacity. In a honeybee colony, each forager sucks up a suitable amount of nectar based on her stomach capacity. Therefore, in the modeling process, the decomposition functionality is integrated within the executers.

Modeling a process involves representing the environment where the process runs and activities and elements that are related to that process. Further examining the NAP, one can differentiate between two groups of important elements: the first group represents elements that are part of the honeybee colony itself, which can be considered as the process environment. This group is used to model the personal mobile grid. The second group represents elements and activities that constitute the NAP. This group is used to implement the resource scheduler. As noted above, a personal mobile grid includes three groups of architectural elements: clients, workers (decomposers, executers and composers) and spaces (workspaces and a result space). A honeybee colony includes two main groups of elements: agents (forager and receiver bees) and places (food sources and a hive). The direct correspondence between elements of the two systems is summarized in Table 2 below:

TABLE 2

Correspondence between honeybee colony and PMG

| Honeybee Colony | Personal Mobile Grid |
|---|---|
| Food Sources | Workspaces |
| Hive | Result space |

TABLE 2-continued

Correspondence between honeybee colony and PMG

| Honeybee Colony | Personal Mobile Grid |
|---|---|
| Forager Bees | Executers |
| Receiver Bees | Composers |

The scheduling problem in a honeybee colony can be formulated by dividing the process into a nectar collecting course and a honey processing course. $N_c$ forager processors are connected to multiple nectar queues. A forager processor $N_i$ assigns itself an average volume of $L_c$ nectar load, from a nectar queue, based on its capacity. $N_i$ delivers its load to a single hive queue, for further processing. $N_i$ spends an average time of $T_c$ to complete a collection course. The collection course is defined as the process from when starts the decision as to which nectar source to access in order to load nectar, until it delivers its load to the hive queue, starting the decision making process again.

Two variables play very important roles in the food collection process of a honeybee colony. These are the quantity of the nectar left in each source (NQ), which determines the waggle dancing threshold (WT), and the unloading time experienced by each returning forager (UT), which determines the tremble dancing threshold. There is strong evidence that the waggle dance threshold is adaptive and different from bee to bee. For the sake of simplicity, in the present scheduling model, each retuning forager calculates the waggle dance threshold (WDT) and tremble dance threshold (TDT) dynamically as WDT=a×(current load), where a>2; and TDT=b×(duration of the collection cycle), where b≧1.

In the nectar collection cycle, the objective of the colony system is to maximize the nectar collection rate $\lambda_p$, and equation (2) becomes:

$$\lambda_p = \frac{N_c L_c}{T_c} \qquad (3)$$

where $T_c$>0. There is strong evidence to suggest that the principal means the system uses to adjust $\lambda_p$ is the alteration of $N_c$, rather than $L_c$ or $T_c$. Thus, equation (3) becomes:

$$\lambda_p = aN_c, \qquad (4)$$

where a is a proportionality constant greater than zero. The scheduling problem in the collection cycle of the nectar acquisition process (NAP) can now be defined as: How to allocate a set of $N_c$ parallel processors to S sources of divisible load jobs, such that the number of delivered jobs per time unit is maximized:

$$\text{Maximize}\{F(N_c)=aN_c\} \qquad (5)$$

where a>0.

In the honey processing cycle, the objective of the colony system is to maximize its honey processing rate $\mu_p$, thus equation (2) becomes:

$$\mu_p = \frac{N_p L_p}{T_p} \qquad (6)$$

where $T_p>0$. There is strong evidence to suggest that the principal means the system uses to adjust $\mu_p$ is the alteration of $N_p$, rather than $L_p$ or $T_p$. Thus, equation (6) becomes:

$$\mu_p = bN_p, \qquad (7)$$

where b is a proportionality constant greater than zero. The scheduling problem in the processing cycle of the nectar acquisition process (NAP) can now be defined as: How to allocate a set of $N_P$ parallel processors to a set of Pjobs, such that the number of delivered jobs per time unit is maximized:

$$\text{Maximize}\{F(N_p)=\mu_p=bN_p\} \qquad (8)$$

where b>0.

Thus, based on both the collection and processing cycles, the end objective of the NAP scheduling problem becomes the maximization of both nectar collection and honey processing rates:

$$\text{Maximize}\{F(N_p), F(N_c)\} \qquad (9)$$

which is further subject to minimizing the differences therebetween:

$$\text{Maximize}\{|F(N_p)-F(N_c)|\} \qquad (10)$$

During the entire NAP, a honeybee colony shows a complete absence of any form of central or hierarchical control. There are no certain authorities giving instructions to other bees regarding who should do what and when; rather, each honeybee makes these decisions for itself independently of all other bees. The scheduling scheme followed in the NAP is based on a non-clairvoyant scheduling policy; it does not require or depend on any information about incoming work. It is also highly adaptive. This can be clearly exemplified by the dynamic allocation of labor among worker bees. Many social insects exhibit a division of labor among their members, which features them in controlling complex systems. However, these labors are permanent, such as in ant and termite workers. Within a honeybee colony, forager and receiver bees dynamically exchange their roles based on the supply (nectar collection) and demand (honey processing), as shown in FIGS. 4A and 4B (steps 30 and 58, respectively). This temporary specialization makes the system more robust and flexible under different loads and scales. Adaptability in honeybees can also be exemplified by the way dancing thresholds are determined by each bee. Each dancer individually decides a dancing threshold for itself based on its perception of the current system state.

As noted above, the objective of a honeybee colony is to maximize its nectar collection and honey processing rates, while maintaining them in balance. Forager bees perform waggle and tremble dances for this purpose. A forager bee starts dancing without knowing the values of these two important global variables. The bee monitors two local variables instead, which are correlated with the global variables but are far easier to calculate; i.e., the waiting time experienced until a receiver bee arrives and the profitability of the last visited nectar source. Relying on local non-expensive parameters makes the scheduler lighter in weight, in terms of implementation, and more robust in dynamic environments.

Further, in a honeybee colony, important information related to the NAP is exchanged only in a centralized shared memory inside the hive, where dances are performed. Neither colony mates nor external elements can alter the shared information. This not only ensures high reliability of exchanged information but also makes it much easier to exchange. Social insects usually communicate important information with their colony mates through implicit messages that alter their shared environment by pheromones or odors. This communication scheme usually takes time before being effective in attracting attention. In contrast, honeybees communicate important information, such as the need for more workers in a certain labor and locations of profitable nectar sources, through explicit advertisements for such information. This has an immediate effect in attracting attention and results in a very efficient group recruitment scheme. Furthermore, there are only two pieces of information that are needed to be exchanged in the colony during the NAP: the location of rich sources and the need for more workers in a certain labor group. Besides exchanging only a limited amount of information, this information is very small in size, and its frequency is relatively low.

Figure 5:
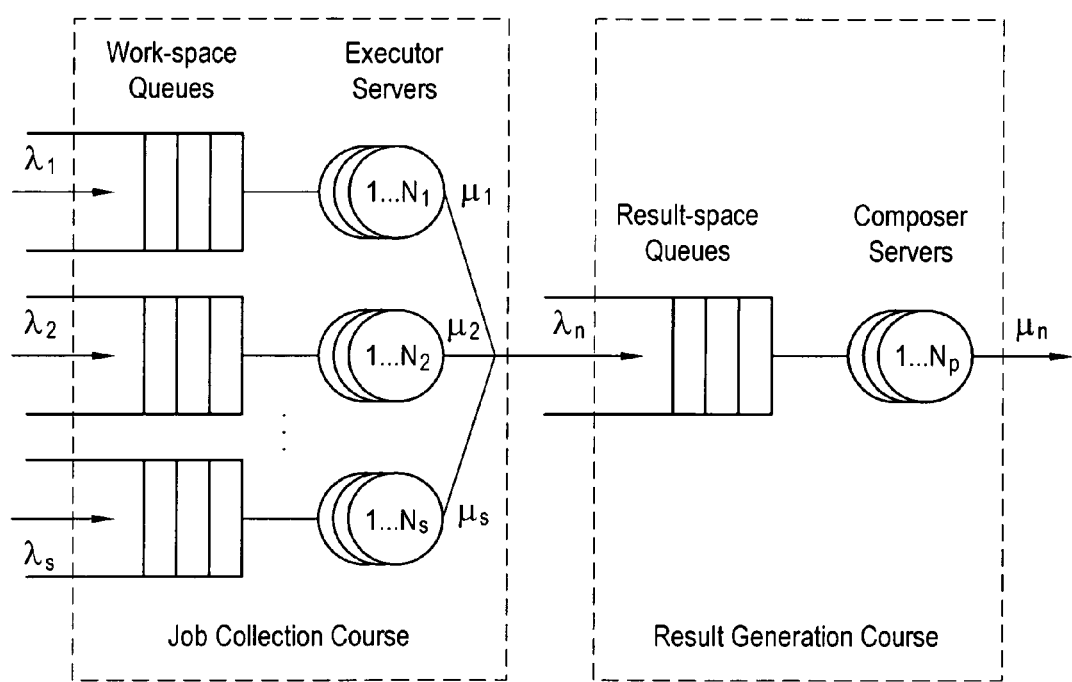
FIG. 5 illustrates the personal mobile grid of FIG. 1 diagrammatically illustrated as a set of queues and servers.

FIG. 5 illustrates the personal mobile grid of FIG. 1 diagrammatically illustrated as a set of queues and servers. The resource scheduler includes communication elements, communication media, communication techniques, and parameters. The communication elements include jobs (where each job is a large computational program that can be divided into an arbitrary number of smaller tasks), task results (i.e., the generated output after executing a task), and job results (i.e., the generated output after composing task results from all tasks that belong to the same job).

The communication media include an executer help list (EHL), a composer help flag (CHF), and a task results list. The executer help list (EHL) is a public dynamic list, residing in the result space. It keeps track of the executer help message (EHM) sent from executers to the result space. The EHL has entries for all active EHMs, which have not yet expired. For heavy loaded workspaces, more EHMs will be received. As a result, they will have more entries in the EHL, raising the probability of picking one of them randomly. Thus, more executers will be attracted to heavy load workspaces. The composer help flag (CHF) is a public structure, also residing in the result space. It has two fields: the first field is a one bit flag which is set to one on receiving a CHM and unset to zero when the message duration is reached. The second field indicates the duration after which the flag should be unset. If a new CHM is received while the flag field has already been set to one, the duration field is updated with the duration value of the more recent CHM. The task results list is a public structure, also residing in the result space. Each entry to this list consists of two fields. The first field contains the name of the file where received task results of a job are accumulated. The second field represents the status of this file. Complete status means that all task-results of this job are available and the file is ready for a composer. Pending status means the task-results have not been completed yet.

The communication techniques include the executer help message (EHM), the composer help message (CHM), the unload request message (URM), and the ready message (RM). The EHM is a message sent by an executer to the result space, which includes the ID of a heavily loaded workspace and its profitability. It is used to attract more executers to this specific workspace, as well as to recruit idle composers to work as executers. Each message has two main fields: one indicating the duration after which the message expires and the other for the ID of the advertised workspace. The duration field is calculated as a function of the RW in the advertised workspace. The CHM is a message sent by an executer to the result space when it experiences a long time waiting for an RM from the result space to indicate that the result space can accept incoming task results. The CHM has a main field for the duration after which the message expires. The message duration is calculated as a function of the WT experienced by the executer. The URM is a message sent by an executer to the result space after generating task results checking if the result space is ready to accept incoming results. The RM is a message sent by the result space to an executer in response to a URM to indicate that the result space is ready to accept task-results. For each task result picked by a composer, an RM is sent (or is ready to be sent) to respond to a URM.

The parameters include a remaining workload (RW), a waiting time (WT), a job collection rate OCR), a result generating rate (RGR), an executer help threshold (EHT), the advertised workspace, an executer help message duration (EHMD), a composer help threshold (CHT), and a composer help message duration (CHMD). The RW is the volume of work remaining in the last visited workspace. The WT is the time from when an executer sent a URM to the result space until it receives an RM from the result space indicating that it can accept incoming task results. The JCR is the number of jobs entering the result space per time unit. The JCR is given by:

$$JCR = \frac{TCR}{k} \quad (11)$$

where TCR is the task processing rate (i.e., the number of tasks entering the result space per time unit) and k is the average number of tasks per job (k>0).

The RGR is the number of jobs leaving the result space after having their job-results composed successfully, per time unit. The EHT is an internal variable of each executer that is related to how the executer assesses the RW in relation to its current workload (CW). When EHT exceeds a certain limit, the executer sends an EHM to the result space. It does not have a fixed value; instead it varies from executer to executer and from time to time under different conditions. In the present resource scheduling method, an EHM is sent when the following conditions are true:

$$RW > c \times CW \quad (12)$$

$$c \geq 1 \quad (13)$$

$$CW > 0 \quad (14)$$

where c is an experimental parameter and CW is the current workload of the executer.

The advertised workspace is the ID of a workspace of which the EHT is exceeded. The EHMD is the elapsed time during which an EHM will be displayed in the EHL. In the present resource scheduling method, the EHMD is calculated as a function of RW and CW:

$$EHMD = \frac{RW}{CW} \quad (15)$$

where CW>0. The CHT is an internal variable of each executer. It is a criterion related to the WT experienced by an executer waiting for an RM from the result space. When CHT exceeds a certain limit, the executer sends a CHM to the result space and it does not have a fixed value; instead, it varies from executer to executer and from time to time under different conditions. In the present scheduling method, a CHM is sent when the following conditions become true:

$$WT > d \times ECD \quad (16)$$

$$d \geq 1 \quad (17)$$

$$ECD = \text{Time URM sent} - \text{time job received} \quad (18)$$

where ECD is the execution cycle duration and d is an experimental parameter.

The CHMD is the elapsed time during which the CHF remains at one after being set by a CHM. It is calculated as a function of the WT experienced by the executer sending the CHM:

$$CHMD = e \times WT \quad (19)$$

$$e \geq 1 \quad (20)$$

where e is an experimental parameter.

There is a clear correspondence between the allocation problems of workers and machines. A mapping of the NAP elements to the elements of the present resource scheduler for personal mobile grids is given below in Table 3:

TABLE 3

Mapping of NAP elements to Resource Scheduler elements

| NAP | Resource Scheduler |
|---|---|
| Nectar | Tasks |
| Raw honey | Task results |
| Comb honey | Job results |
| Dancing floor | Executer help list |
| Unloading area | Composer help flag |
| Combs | Task results list |
| Waggle dance | Executer help message |
| Tremble dance | Composer help message |
| Forager waiting in unloading area | Unload request message |
| Receiver waiting in unloading area | Ready message |
| Profitability | Remaining workload |
| Waiting time | Waiting time |
| Nectar collecting rate | Job collecting rate |
| Honey processing rate | Result generating rate |
| Waggle dance threshold | Executer help threshold |
| Tremble dance threshold | Composer help threshold |
| Advertised nectar source | Advertised workspace |
| Waggle dance duration | Executor help message duration |
| Tremble dance duration | Composer help message duration |

Figure 6:
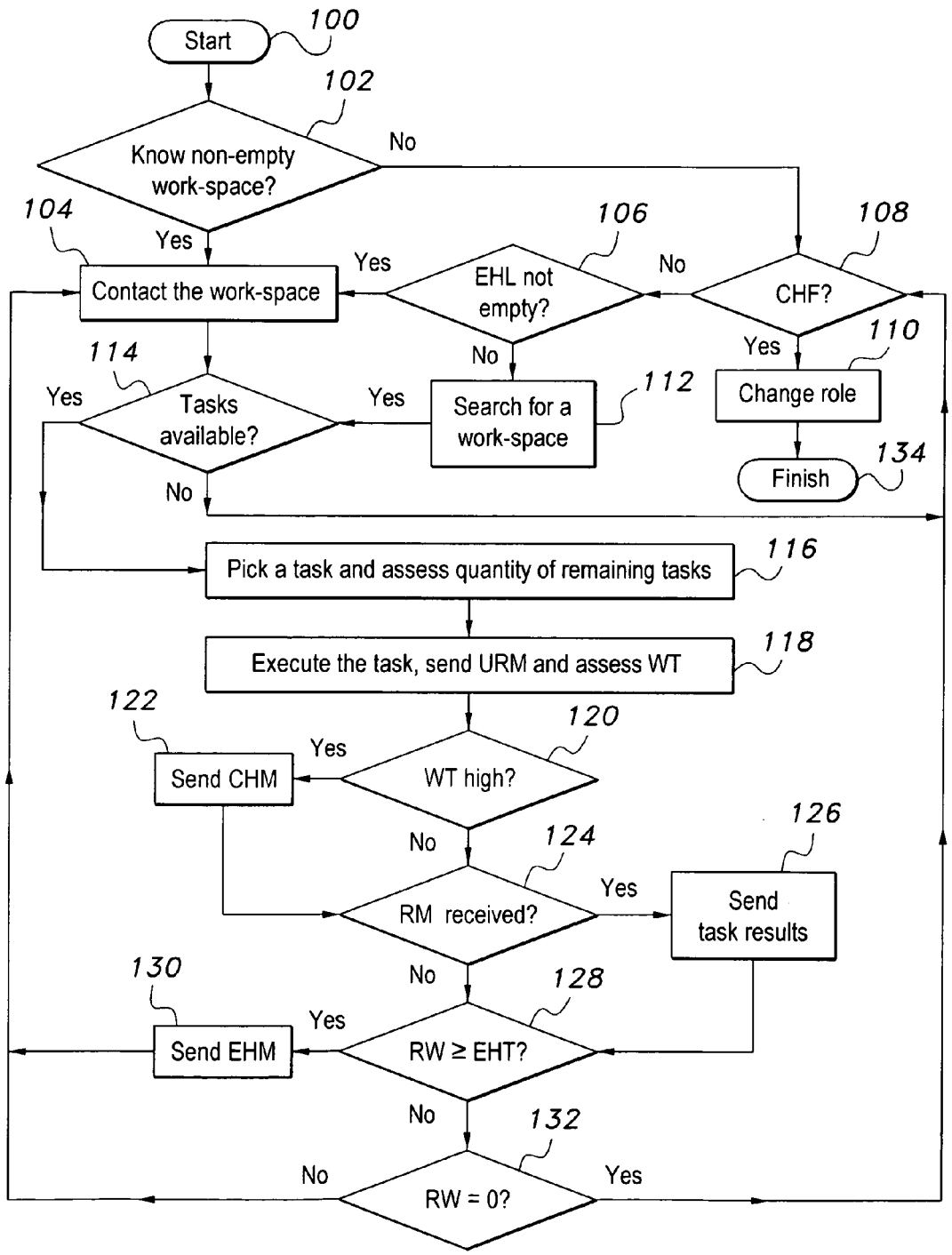
FIG. 6 is a flowchart illustrating executer processes of the method of forming a personal mobile grid system and resource scheduling thereon according to the present invention.

The resource scheduler operates in two stages: an initialization stage and a dynamic scheduling stage. In the initialization stage, initial device roles are assigned. The result space is co-located with the PN agent and is advertised by it at the PN formation stage. Workspaces are identified and registered with the result space in the current-workspaces-list. Worker devices are also identified and registered with the result space in the active-workers-list. The result space updates both lists frequently through periodic "Hello" messages. Worker devices access the result space when they need to update their copies of the current-workspaces-list. The dynamic scheduling stage of the resource scheduler is illustrated in FIG. 6 for executers and for composers in FIG. 7. It should be understood that these algorithms serve as skeletons; i.e., implementation details, such as data preparation, parameter passing, data structure, etc. differ according to the requirements of various applications and running environments.

In FIG. 6, the executer dynamic scheduling process begins at step 100 and a determination as to the presence of non-empty workspaces is made at step 102. If no non-empty workspaces are found, then a determination is made as to whether the composer help flag is set (step 108). If a composer help flag is set, then the executer reverses roles at 110 and becomes a composer, finishing the process at step 134.

If the composer help flag (at step 108) is unset, then the executer help list is examined at step 106. If the executer help list is found to be empty, then a workspace is searched for at step 112. If the executer help list is not empty, then the workspace is contacted at step 104. Returning to step 102, if a non-empty workspace is initially found, the flow immediately goes to contacting the workspace at step 104.

From either searching for the workspace at step 112 or from the known workspace contacted at step 104, a determination as to task availability is made at step 114. If no tasks are available, then flow returns to step 108. If tasks are available, then a task is randomly selected by the executer, and the quantity of remaining tasks is assessed at step 116. The task is then executed by the executer, an unload request message is sent, and waiting time is assessed (all at step 118).

The waiting time is compared against a waiting time threshold value (i.e., CHT), and if the waiting time is determined to be "high", then a composer help message is sent at step 122. After the composer help message is sent, or if the waiting time is not "high", then the reception of a ready message is determined at step 124. If a ready message has been received, then task results are sent at step 126 and flow proceeds to step 128, where a determination is made as to whether the remaining workload is greater than or equal to the executer help threshold. If a ready message is not received at step 124, then the flow proceeds directly to step 128. If the remaining workload is greater than or equal to the executer help threshold, then an executer help message is sent at step 130 and flow returns to step 104. If the remaining workload is less than the executer help threshold, then the remaining workload is tested at step 132 to determine if it is zero. If the remaining workload is non-zero, then flow returns to step 104. If the remaining workload is zero, then flow returns to step 108.

Figure 7:
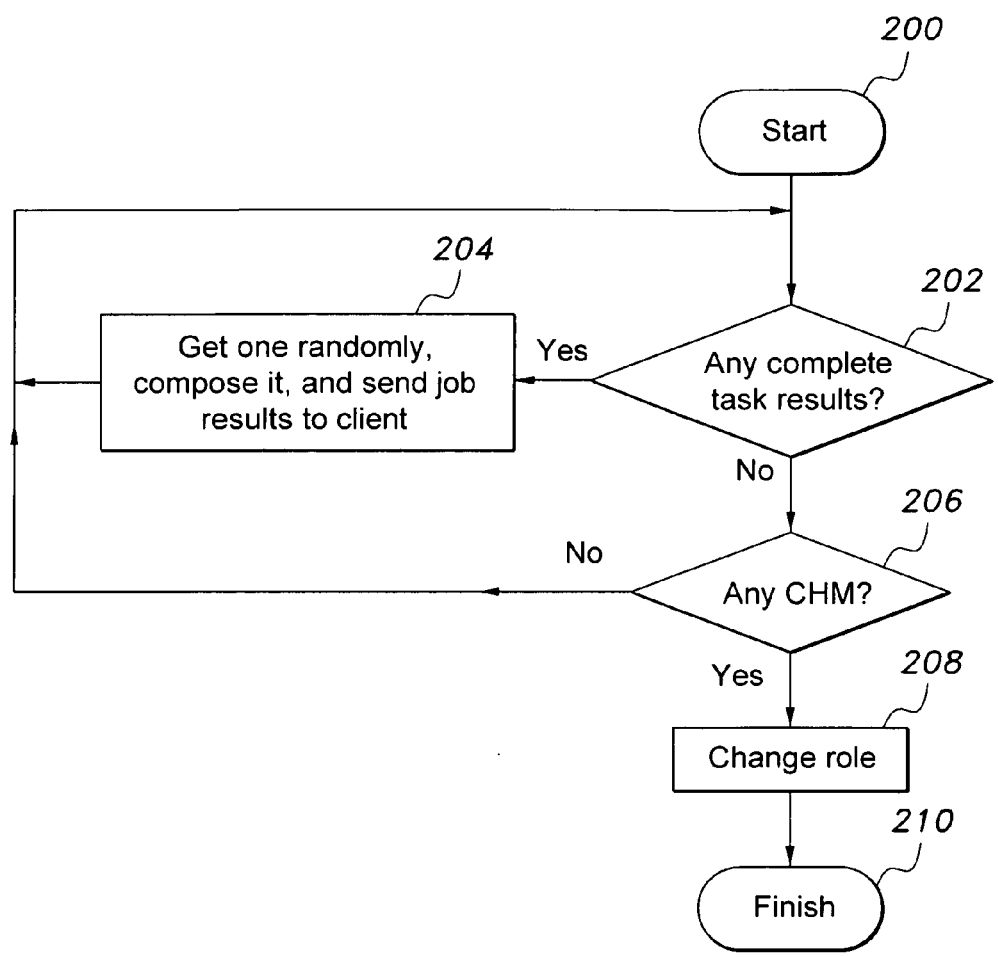
FIG. 7 is a flowchart illustrating composer processes of the method of forming a personal mobile grid system and resource scheduling thereon according to the present invention.

In FIG. 7, the composer dynamic scheduling process begins at 200. At step 202, it is determined if there are any complete task results. If there are complete task results, then a complete task result is randomly selected, composed by the composer and the job results are sent to the client (all at step 204). The process then begins again, returning to step 202. If no complete task results exist at step 202, then a determination is made at step 206 as to the presence of a composer help message. If no composer help message is present, the process begins again, returning to step 202. If a composer help message has been received, then the composer reverses roles at step 208, becoming an executer, and the process completes at step 210.

The formation and resource scheduling of the personal grid system can be summarized as follows: (a) forming a computational grid network from a plurality of networked devices; and (b) dividing the plurality of networked devices into a plurality of task executers and a plurality of task composers.

Each executer performs the following steps (c) through (o): (c) determining if a non-empty workspace exists in the computational grid network; (d) if a non-empty workspace exists, then contacting the non-empty workspace; (e) if a non-empty workspace does not exist, then determining if a composer help message has been generated by one of the task composers, and if a composer help message has been generated, then the executer transforms to a composer, and if a composer help message has not been generated, then polling an executer help list to determine if the executer help list is empty, and if the executer help list is not empty, then contacting the non-empty workspace, and if the executer help list is empty, then searching for a non-empty workspace; (f) determining if tasks are available for execution, and if no tasks are available, then returning to step (e); (g) randomly selecting a task to be executed; (h) assessing a quantity of remaining tasks in the workspace; (i) executing the task selected in step (g); (j) sending an unload request message; (k) assessing a waiting time; (l) comparing the waiting time with a waiting time threshold value (i.e., the composer help threshold), and if the waiting time is greater than the waiting time threshold value, then sending a composer help message; (m) determining if a ready message has been received, and if a ready message has been received, then sending task results of the executed task; (n) determining if a remaining workload is greater than or equal to an executer help threshold, and if the remaining workload is greater than or equal to the executer help threshold, then sending an executer help message and returning to step (d); (o) determining if the remaining workload is zero, and if the remaining workload is non-zero, then returning to step (d), and if the remaining workload is zero, then returning to step (e).

Each composer performs the following steps (p) through (q): (p) determining if any tasks have complete results, and if any tasks have complete results, then randomly selecting a complete result, composing the result and sending job results to the client, and if no tasks with complete results exist, then determining if a composer help message has been received, and if a composer help message has been received, then transforming into an executer; and (q) returning to step (p).

It is to be understood that the present invention is not limited to the embodiments described above, but encompasses any and all embodiments within the scope of the following claims.

I claim:

1. A method of resource scheduling in a personal mobile grid, comprising the steps of:
   (a) forming a computational grid network from a plurality of networked devices;
   (b) dividing the plurality of networked devices into a plurality of task executers and a plurality of task composers;
   each said executer performing the following steps (c) through (o):
   (c) determining if a non-empty workspace exists in the computational grid network;
   (d) if a non-empty workspace exists, then contacting the non-empty workspace;
   (e) if a non-empty workspace does not exist, then determining if a composer help message has been generated by one of the task composers, and if a composer help message has been generated, then the executer transforms to a composer, and if a composer help message has not been generated, then polling an executer help list to determine if the executer help list is empty, and if the executer help list is not empty, then contacting the non-empty workspace, and if the executer help list is empty, then searching for a non-empty workspace;
   (f) determining if tasks are available for execution, and if no tasks are available, then returning to step (e);
   (g) randomly selecting a task to be executed;
   (h) assessing a quantity of remaining tasks in the workspace;
   (i) executing the task selected in step (g);
   (j) sending an unload request message;
   (k) assessing a waiting time;
   (l) comparing the waiting time with a waiting time threshold value, and if the waiting time is greater than the waiting time threshold value, then sending a composer help message;
   (m) determining if a ready message has been received, and if a ready message has been received, then sending task results of the executed task;
   (n) determining if a remaining workload is greater than or equal to an executer help threshold, and if the remaining workload is greater than or equal to the executer help threshold, then sending an executer help message and returning to step (d);

(o) determining if the remaining workload is zero, and if the remaining workload is non-zero, then returning to step (d), and if the remaining workload is zero, then returning to step (e);

each said composer performing the following steps (p) through (q):

(p) determining if any tasks have complete results, and if any tasks have complete results, then randomly selecting a complete result, composing the result and sending job results to the user, and if no tasks with complete results exist, then determining if a composer help message has been received, and if a composer help message has been received, then transforming into an executer; and (q) returning to step (p).

2. A method of resource scheduling in a personal mobile grid, comprising the steps of:

(a) forming a computational grid network from a plurality of networked devices;

(b) dividing the plurality of networked devices into a plurality of task executers and a plurality of task composers;

(c) modeling task execution in the plurality of task executers on the behavior of forager honeybees such that the plurality of task executers are represented as $N_c$ forager processors connected to multiple nectar queues, wherein $N_c$ is an integer representing the number of task executers and a task to be executed is represented as nectar to be processed, an i-th forager processor $N_i$ assigning itself an average volume of nectar load $L_c$ from a nectar queue, based on its capacity, and delivering the nectar load to a single hive queue;

(d) representing a task execution rate as a nectar collection rate and maximizing the nectar collection rate $\lambda_p$ such that $\lambda_p = aN_c$, wherein a is a proportionality constant greater than zero;

(e) modeling task composing in the plurality of task composers on the behavior of receiver honeybees such that the plurality of task composers are represented as $N_p$ receiver processors;

(f) representing a task composition rate as a nectar processing rate and maximizing the nectar processing rate $\mu_p$ such that $\mu_p = bN_p$, wherein b is a proportionality constant greater than zero;

(g) re-assigning the plurality of networked devices into an optimized plurality of task executers and an optimized plurality of task composers based upon the maximization of the task execution rater and the maximization of the task composition rate; and (h) returning to step (d).

3. A personal mobile grid system, comprising:

a computational grid network formed from a plurality of networked devices, wherein the plurality of networked devices are divided into a plurality of task executers and a plurality of task composers, wherein each said executer comprises:

means for determining if a non-empty workspace exists in the computational grid network, whereby if a non-empty workspace exists, then the non-empty workspace is contacted, and if a non-empty workspace does not exist, then said executer determines if a composer help message has been generated by one of the task composers, and if a composer help message has been generated, then the executer transforms to a composer, and if a composer help message has not been generated, then the executer polls an executer help list to determine if the executer help list is empty, and if the executer help list is not empty, then the executer contacts the non-empty workspace, and if the executer help list is empty, then the executer searches for a non-empty workspace;

means for determining if tasks are available for execution, whereby if no tasks are available, then the executer determines if a non-empty workspace exists again;

means for randomly selecting a task to be executed;

means for assessing a quantity of remaining tasks in the workspace;

means for executing the randomly selected task selected;

means for sending an unload request message;

means for assessing a waiting time;

means for comparing the waiting time with a waiting time threshold value, whereby if the waiting time is greater than the waiting time threshold value, then the executer sends a composer help message;

means for determining if a ready message has been received, whereby if a ready message has been received, then the executer sends task results of the executed task;

means for determining if a remaining workload is greater than or equal to an executer help threshold, whereby if the remaining workload is greater than or equal to the executer help threshold, then the executer sends an executer help message and returning to determining if a non-empty workspace exists; and means for determining if the remaining workload is zero, whereby if the remaining workload is non-zero, then returning to determining if a non-empty workspace exists, and if the remaining workload is zero, then returning to determining if a composer help message has been generated by one of the task composers;

wherein each said composer comprises:

means for determining if any tasks have complete results, whereby if any tasks have complete results, then the composer randomly selects a complete result, composes the result and sends job results to the user, and if no tasks with complete results exist, then the composer determines if a composer help message has been received, and if a composer help message has been received, then the composer transforms into an executer.

* * * * *